United States Patent Office 3,767,639
Patented Oct. 23, 1973

3,767,639
PROCESS FOR THE PREPARATION OF SECRETIN
Miklos Bodanszky, Princeton, Miguel A. Ondetti, Highland Park, Malcolm H. von Saltza, Millstone, and Venkatachala L. Narayanan and Seymour D. Levine, North Brunswick, N.J., assignors to E. R. Squibb & Sons, Inc., New York, N.Y.
No Drawing. Continuation of abandoned application Ser. No. 736,947, Apr. 12, 1968, which is a division of application Ser. No. 553,290, May 27, 1966, now Patent No. 3,400,118, dated Sept. 3, 1968. This application Apr. 17, 1970, Ser. No. 28,237
Int. Cl. C07c $103/52$
U.S. Cl. 260—112.5   5 Claims

ABSTRACT OF THE DISCLOSURE

The gastrointestinal hormone secretin is prepared by fragment condensation. The tetrapeptide L-Thr-L-Phe-L-Thr-L-Ser is coupled to the C-terminal nonadecapeptide of the hormone, and the tetrapeptide L-His-L-Ser-$\beta$-benzyl-L-Asp-Gly is coupled to the tricosapeptide resulting from the first coupling.

RELATED APPLICATION

This application is a continuation of copending application Ser. No. 736,947 filed Apr. 12, 1968, now abandoned, which is a division of Ser. No. 553,290 filed May 27, 1966 now Pat. No. 3,400,118.

This invention relates to novel peptides, and more particularly, to peptide intermediates and their salts utilized in the preparation of the gastrointestinal hormone, secretin. Porcine secretin has the formula:

His-Ser-Asp-Gly-Thr-Phe-Thr-Ser-Glu-Leu-Ser-Arg-
1     2    3    4   5   6   7   8   9  10   11  12

Leu-Arg-Asp-Ser-Ala-Arg-Leu-Glu(NH$_2$)-Arg-Leu-
13   14  15   16  17  18   19     20       21   22

Leu-Glu-(NH$_2$)-Gly-Leu-Val-NH$_2$
23  24          25  26   27 and hence it is a peptide containing 27 amino acid residues containing the amino acids: L-histidine (His); L-aspartic acid (Asp); L-serine (Ser); glycine (Gly); L-threonine (Thr); L-phenylalanine (Phe); L-glutamic acid (Glu); L-glutamine [Glu(NH$_2$)]; L-leucine (Leu); L-arginine (Arg); L-alanine (Ala); and L-valinamide (Val-NH$_2$).

The above mentioned peptide salts include, for instance, hydrochlorides, hydrobromides, acetates, fluoroacetates, such as trifluoroacetate, and chloroacetates such as dichloroacetate.

This 27 membered chain of amino acids is synthesized by preparing partial sequences of amino acids and then combining the sequences to form the end product of this invention.

Although the number of amino acids may differ in each sequence, e.g., 2, 5, 7, and so forth, in the preparation of secretin, it has been found that four sequences of amino acids can satisfactorily combine to give the desired end product.

The novel four protected peptides corresponding to these partial sequences are:

(1) protected L - histidyl - L - seryl-L-aspartylglycine; (amino acids 1 to 4);

(2) protected L-threonyl - L - phenylalanyl-L-threonyl-L-serine hydrazide; (amino acids 5 to 8);

(3) protected L - glutamyl-L-leucyl-L-seryl-L-arginyl-L-leucine hydrazide; (amino acids 9 to 13), and (4) protected L - arginyl-L-aspartyl-L-seryl-L-alanyl-L-arginyl - L - leucyl - L - glutaminyl-L-arginyl-L-leucyl-L-leucyl-L-glutamylglycyl - L - leucyl-L-valinamide; (amino acids 14 to 27).

The above sequences may be joined by any known coupling method of peptide synthesis to form polypeptides. The secretin polypeptide may be obtained by methods known for the synthesis of peptides. It is possible to join together the amino acids indicated in the above formulae, one at a time or by first forming constituent peptide unit sequences and joining these together until the hormone secretin results.

Such addition is accomplished by activating the carboxylic acid group in the amino acid to be added, as by protecting the amino group in such amino acid by converting it to its benzyloxycarbonyl derivative and converting it to its nitrophenyl ester derivative, and then interacting the peptide sequence.

Among the suitable activating groups may be mentioned any group which causes the acid function to become more reactive, such as mixed anhydrides (which normally involves the acylation of an amine with the mixed anhydrides of, for instance, an acyl amino acid and isovaleric acid), azides, acid chlorides, O-acyl hydroxylamine derivatives, and active esters, such as alkyl esters with electron attracting (negative) substituents, vinyl esters, enol esters, phenyl esters, thiophenyl esters, nitrophenyl esters, 2,4-dinitrophenyl esters, and nitrophenylthiol esters. The use of nitrophenyl esters is particularly preferred from the standpoint of yield, lack of complicating by-products and consequent ease of purification.

In forming peptide sequences of this invention, the amino functions may be protected by commonly used amino protecting groups such as benzyloxycarbonyl, tertiary butyloxycarbonyl phthalyl, o-nitrophenylsulfenyl, tosyl, and so forth. Methyl, ethyl, tertiary butyl, benzyl and so forth may be used to protect the carboxyl groups. The hydroxyl protecting groups may be benzyl, tert. butyl, tetrahydropyranyl and so forth, and the guanidine protecting groups may be nitro, tosyl, p-nitrobenzyloxycarbonyl, protonation, and so forth.

The protecting groups are removed by known reactions such as reduction with sodium in liquid ammonia, hydrogenolysis (for instance, in the presence of a palladium on charcoal catalyst), treatment with a hydrohalo acid (such as hydrobromic or hydrochloric acids) in acetic acid or treatment with trifluoroacetic acid.

To prepare the free amines after treatment with a hydrohalo acid in acetic acid, the hydrobromide salt is treated either with an ion exchange resin such as Amberlite IR400 or so neutralized with an amine such as triethylamine.

EXAMPLE 1

Benzyloxycarbonyl-L-valinamide (I)

Benzyloxycarbonyl-L-valine p-nitrophenylester (M.P. 67–68°, 18.6 g.) is suspended in methanol (50 ml.) to dissolve part of the material. A methanolic solution of ammonia (40 ml., ca. 3 N) is added. A clear yellow solution results and crystallization of the product starts after a few minutes. After one hour at room temperature, the crystals are filtered and washed with methanol (ca. 50 ml.) and with ethyl acetate (ca. 50 ml.). The air dried product (8.25 g.) melts at 206–208°. From the mother liquor, more material (0.95 g.) is secured, M.P. 206–207°. Total yield, 9.2 g. (73.5%). A sample (3.5 g.) is recrystallized from ethyl acetate (450 ml.). The purified amide (3.0 g.) melts at 206–208°, $[\alpha]_D^{22}$ +22° (c. 2, dimethylformamide). The melting point is unchanged after sublimation at 190° and 0.05 mm. Hg.

Analysis.—Calc'd for I, $C_{13}H_{18}N_2O_3$ (percent): C, 62.4; H, 7.2; N, 11.2. Found (percent): C, 62.4; H, 7.3; N, 11.2.

EXAMPLE 2

Benzyloxycarbonyl-L-leucyl-L-valinamide (II)

Benzyloxycarbonyl-L-valinamide (I) (12.5 g.) is suspended in acetic acid (50 ml.) and treated with hydrobromic acid in acetic acid (ca. 4 N, 50 ml.). Soon a clear solution is obtained and evolution of gas ($CO_2$) can be observed and later also the deposition of crystals. After one and a half hours at room temperature, ether (250 ml.) is added and the crystalline hydrobromide is filtered off, washed with ether (125 ml.) and dried over sodium hydroxide in vacuo. The yield is quantitative (9.8 g.), M.P. 248–253°. The amide hydrobromide is dissolved in dimethylformamide (100 ml.), triethylamine (10 ml.) is added to the solution followed by benzyloxycarbonyl-L-leucine p-nitrophenylester (23.2 g.). Some heat evolution will be observed. The mixture is cooled to room temperature; after a few minutes, it shows no ninhydrin reaction and soon it turns into a semisolid mass of crystals. After three hours at room temperature, the mixture is diluted with ethyl acetate (300 ml.), filtered and the crystals washed with ethyl acetate (200 ml.), chloroform (300 ml.) and again with ethyl acetate (200 ml.). The air dried product (15.8 g.) sinters at 225° and melts at 232–234°. From the mother liquors a small second crop (0.25 g.) is obtained, M.P. 232–233°. Total yield, 88%. Recrystallization of a sample from hot 95% ethanol raises the M.P. to 234–236°, $[\alpha]_D^{22}$ —1° (c. 2.5, dimethylformamide). The protected dipeptide amide sublimes unchanged at 220° and 0.05 mm. Hg.

Analysis.—Calc'd for II, $C_{19}H_{29}N_3O_4$ (percent): C, 62.8; H, 8.0; N, 11.6. Found (percent): C, 62.9; H, 8.1; N, 11.6.

EXAMPLE 3

Benzyloxycarbonyl-glycyl-L-leucyl-L-valinamide (III)

To a suspension of the protected dipeptide amide (II), (14.6 g.) in acetic acid (40 ml.) hydrobromic acid in acetic acid (ca. 4 N, 40 ml.) is added. After one and a half hours at room temperature, the mixture is diluted with ether (400 ml.). A semisolid mass forms and is treated with fresh ether until it disintegrates. The hydrobromide is filtered off, washed with ether and dried in vacuo over sodium hydroxide for one hour. It is dissolved in dimethylformamide (100 ml.), triethylamine (14 ml.) and benzyloxycarbonylglycine p-nitrophenylester (16.5 g.) are added to the solution. Some evolution of heat is observed and the mixture is cooled to room temperature where it is kept for about three hours. The precipitate (triethylammonium bromide) is filtered off and washed with dimethylformamide (50 ml.). Ethyl acetate (500 ml.) and N HCl (400 ml.) are added to the filtrate and the organic layer is washed with N HCl (400 ml.) and with water (twice 400 ml.). The aqueous washes are extracted in the same order with a portion (ca. 300 ml.) of ethyl acetate. From the combined ethyl acetate solutions, a precipitate slowly forms. Most of the solvent is removed by evaporation and the protected tripeptide amide is washed with ethyl acetate. The dry product weighs 16.8 g. (quantitative yield), M.P. 170–175° with some sintering at 160°. This crude product is extracted with boiling ethyl acetate (ca. 200 ml.) to give 14.5 g. (86%) of a product with a melting point of 186–187°. A sample (0.60 g.) is recrystallized from hot water (300 ml.); the crystals are washed with water (100 ml.) and dried. The recovered material (0.50 g.) melts at 187–190°, $[\alpha]_D$ —14° (c. 2, dimethylformamide).

Analysis.—Calc'd for III, $C_{21}H_{32}N_4O_5$ (percent): C, 60.0; H, 7.7; N, 13.3. Found (percent): C, 60.2; H, 7.7; N, 13.1.

EXAMPLE 4

Benzyloxycarbonyl-L-glutaminylglycyl-L-leucyl-L-valinamide (IV)

The benzyloxycarbonyl group is removed from the protected tripeptide amide (III) (12.7 g.) as described in the previous paragraph. To the solution of the hydrobromide in dimethylformamide (90 ml.), triethylamine (11.2 ml.) and benzyloxycarbonyl-L-glutamine p-nitrophenylester (13.25 g.) are added. The mixture, which is cooled with water to keep it at room temperature, soon turns into a semisolid mass of crystals. After standing overnight at room temperature, the mass is disintegrated wtih the aid of chloroform (600 ml.). The product is filtered and washed on the filter with chloroform (200 ml.), with warm ethyl acetate (200 ml.), warm ethanol (200 ml.) and again with warm ethyl acetate (300 ml.). The protected tetrapeptide amide is dried at 50° in vacuo; weight is 16.0 g. (95% yield), M.P. 239–241° dec., $[\alpha]_D^{22}$ —13° (c. 2, dimethylformamide).

Analysis.—Calc'd for IV, $C_{26}H_{40}N_6O_7$ (percent): C, 56.9; H, 7.3; N, 15.3. Found (percent): C, 56.9; H, 7.3; N, 15.5.

EXAMPLE 5

Benzyloxycarbonyl-L-leucyl-L-glutaminylglycyl-L-leucyl-L-valinamide (V)

The protected tetrapeptide amide (IV) (13.8 g.) is suspended in acetic acid (40 ml.) and treated with hydrobromic acid in acetic acid (ca. 4 N, 40 ml.). After two hours at room temperature, the reaction mixture is diluted with ether (650 ml.), the hydrobromide is filtered off and washed with ether (400 ml.). After short drying in vacuo over sodium hydroxide, the hydrobromide is dissolved in dimethylformamide (75 ml.) and triethylamine (2.5 ml.) is added to the solution followed by benzyloxycarbonyl-L-leucine p-nitrophenylester (11.6 g.). The precipitate (triethyl ammonium bromide) is filtered off and washed with dimethylformamide (25 ml.). After three hours, the mixture is diluted with 95% ethanol (600 ml.), the product is filtered off and washed on the filter with 95% ethanol (200 ml.) and ethyl acetate (50 ml.). The protected pentapeptide amide is dried at 50° in vacuo; weight is 13.5 g. (81.5%), M.P. 262–268° dec. (with sintering at 259°). A small second crop (0.70 g.) separates from the pooled mother liquor and washings, M.P. 256–259° dec. This is recrystallized from acetic acid-95% ethanol to give a product (0.50 g.) with M.P. 263–270° dec. Total yield is 14.0 g. (84%).

Analysis.—Calc'd for V, $C_{32}H_{51}N_7O_8$ (percent): C, 58.1; H, 7.8; N, 14.8. Found (percent): C, 58.1; H, 7.8; N, 14.6.

EXAMPLE 6

L-leucyl-L-glutaminylglycyl-L-leucyl-L-valinamide hydrobromide (Va)

Compound V (3.3 g.) is dissolved in hot acetic acid (20 ml.), the solution is cooled to room temperature and hydrobromic acid in acetic acid (ca. 4 N, 10 ml.) added. After one hour at room temperature, the solution is diluted with ether (250 ml.), the gummy precipitate disintegrated under fresh ether and washed with ether on the filter. The crude hydrobromide is dried in a desiccator over sodium hydroxide overnight. It is dissolved in methanol (50 ml.) and precipitated with ether (150 ml.). The gummy precipitate is dissolved in absolute ethanol (ca. 200 ml.). A crystalline precipitate separates slowly from the solution. Triethylamine (ca. 1 ml.) is added to neutralize the solution. The crystals are washed with ethanol (100 ml.) and dried over $P_2O_5$ in vacuo at room temperature. Weight is 0.50 g., M.P. 215–216° dec. after sintering at 210°. Evaporation of the mother liquor to dryness and treating of the residue with chloroform (50 ml.) gives a second crop, 1.75 g., M.P. which is similar to the first crop. A small third crop (0.35 g.) is obtained from the mother liquors of the second, M.P. 220–222° dec. On paper chromatograms in the system of butanol: acetic acid: water (4:1:5), a single spot ($R_f=0.60$) is shown by all the fractions. Total yield is 2.60 g. (86%). A sample (0.50 g.) is dissolved in hot 95% ethanol (25 ml.). On standing, slow crystallization occurs; a few days later, ethyl acetate (25 ml.) is added and two days later the crystals are filtered off, washed with a 1:1 mixture of ethanol-ethyl acetate (20 ml.) and with ethyl acetate (20 ml.). After drying, the crystals weigh 0.40 g., M.P. 220° dec. (sinters at 200°). A sample is dried at 110° for analysis.

*Aanlysis.*—Calc'd for VI, $C_{24}H_{46}N_7O_6Br$ (percent): C, 47.2; H, 7.7; N, 16.1; Br, 13.2. Found (percent): C, 47.2; H, 7.7; N, 15.9; Br, 13.0.

Amino acid analysis: Glu, 0.9; Gly, 1.1; Val, 1.0; Leu, 2.3; $NH_3$, 0.9.

EXAMPLE 7

L-leucyl-L-glutaminylglycyl-L-leucyl-valinamide (Vb)

The pentapeptide amide hydrobromide (Va) (0.30 g.) is dissolved in methanol (50 ml.) and treated with Amberlite IR400 in OH cycle until the solution gives a negative test with silver nitrate. The resin is removed by filtration, washed with methanol and the solvent removed in vacuo. The residue is treated with chloroform (5 ml.) in which it partially dissolves. Ethyl acetate (50 ml.) is added. The product is filtered and washed with ethyl acetate (25 ml.) and dried in air, weight is 0.20 g., M.P. 260–261° dec. The product gives a single spot, $R_f=0.60$ on paper chromatograms.

*Analysis.*—Calc'd for VII, $C_{24}H_{45}N_7O_6$ (percent): C, 54.6; H, 8.6; N, 18.6. Found (percent): C, 55.0; H, 8.6; N, 18.6.

EXAMPLE 8

Benzyloxycarbonyl-L-leucyl-L-leucyl-L-glutaminylglycyl-L-leucyl-L-valinamide (VI)

The pentapeptide amide hydrobromide (Va) (1.22 g.) is suspended in dimethylformamide (10 ml.) in which it partially dissolves. Benzyloxycarbonyl-L-leucine p-nitrophenylester (1.55 g.) is added to the mixture which is shaken vigorously for a few minutes, diluted with dimethylformamide (10 ml.), and shaken again. After two hours at room temperature, the mixture is diluted with ethyl acetate (150 ml.), filtered and washed with ethyl acetate (20 ml.). The precipitate is suspended in absolute ethanol (30 ml.), washed on the filter with absolute ethanol (20 ml.) and with ethyl acetate (20 ml.). After drying, the protected hexapeptide amide weighs 1.55 g. (100%); the product sinters at 255°, melts with decomposition at 258–262°.

*Analysis.*—Calc'd for VI, $C_{38}H_{62}N_8O_9$ (percent): C, 58.9; H, 8.1; N, 14.5. Found (percent): C, 58.3; H, 7.9; N, 13.9.

EXAMPLE 9

L-leucyl-L-leucyl-L-glutaminylglycyl-L-leucyl-L-valinamide hydrobromide (VIa)

The protected hexapeptide amide (VI) (0.39 g.) is suspended in acetic acid (5 ml.) and treated with hydrobromic acid in acetic acid (4 N, 5 ml.). Soon a clear solution results. After one and a half hours at room temperature, ether (200 ml.) is added; the precipitate is filtered, washed with ether and dried in vacuo over sodium hydroxide. The salt is hygroscopic. Since it gives a single spot ($R_f=0.75$) with ninhydrin on paper chromatograms in butanol-acetic acid-water (4:1:5), it is used without purification.

EXAMPLE 10

L-leucyl-L-leucyl-L-glutaminylglycyl-L-leucyl-L-valinamide (VIb)

The hexapeptide amide hydrobromide (VIa) (from 0.39 g. protected peptide) is converted to the free base as described in Example 7. The product (0.29 g.) separates in crystalline form. On paper chromatograms, it shows a single spot with $R_f=0.75$, M.P. 239–241° dec.

*Analysis.*—Calc'd for X, $C_{30}H_{56}N_8O$ (percent): C, 56.2; H, 8.8; N, 17.5. Found (percent): C, 56.1; H, 8.9; N, 16.9.

A sample is hydrolyzed with constant boiling hydrochloric acid in an evacuated, sealed ampoule at 110° for 24 hours; it gives 5.1% $NH_3$, calc'd 5.3%. Quantitative amino acid analysis gives the following molar ratios: Leu, 3.0; Glu, 1.1; Gly, 1.1; Val, 1.1.

EXAMPLE 11

Benzyloxycarbonyl-nitro-L-arginyl-L-leucyl-L-leucyl-L-glutaminylglycyl-L-leucyl-L-valinamide (VII)

A solution of $N^\alpha$-benzyloxycarbonyl-nitro-L-arginine (3.53 g.) and of 2,4-dinitrophenol (2.0 g.) in tetrahydrofuran (60 ml.) is cooled with ice water during the addition of dicyclohexylcarbodiimide (2.1 g.). After about one hour at room temperature, the precipitate (dicyclohexylurea) is filtered off and is washed with tetrahydrofuran (40 ml.). The combined filtrate and washings are evaporated to dryness in vacuo, the residue dissolved in ethyl acetate (ca. 10 ml.) and precipitated with ether (ca. 50 ml.). The ester is washed with ether (ca. 50 ml.) and dried in vacuo.

The hexapeptide amide (VIb) (from 3.9 g. protected hexapeptide amide by the procedure of Example 10 is dissolved in hot (ca. 80°) dimethylformamide (150 ml.) and is mixed with a solution of the above active ester in the same solvent (50 ml.). After about four hours at room temperature, the mixture is diluted with ether (1 liter), the precipitate filtered, washed with ether (0.6 liter), ethyl acetate (0.3 liter) and dried. The product, weight 4.5 g. (92%), M.P. 240–242° (dec.), $[\alpha]_D^{25}$ —38° (c. 2, acetic acid), is shown to be homogeneous by treatment of a small sample with hydrobromide acid in acetic acid, precipitation of the hydrobromide with ether and paper chromatography of this material. A single spot, $R_f=0.83$, is observed in the n-butanol-acetic acid-water (4:1:5) system.

A sample, 0.20 g., is recrystallized from hot 50% ethanol (22 ml.), the crystals are washed with ethanol and ethyl acetate. 0.12 g. is recovered, M.P. ca. 252° dec., $\lambda_{max}^{EtOH}$ 269 m$\mu$, $E_{1\%}^{1\ cm.}$ 144

*Analysis.*—Calc'd for $C_{44}H_{73}N_{13}O_{12}$ (percent): C, 54.2; H, 7.5; N, 18.7. Found (percent): C, 54.3; H, 7.6; N, 18.3.

EXAMPLE 12

Benzyloxycarbonyl - L - glutaminyl - nitro-L-arginyl-L-leucyl - L - leucyl-L-glutaminylglycyl-L-leucyl-L-valinamide (VIII)

The protected heptapeptide (VII) (9.8 g.) is dissolved in warm acetic acid (50 ml.), cooled, and treated with hydrobromic acid in acetic acid (ca. N, 50 ml.). After one hour at room temperature, ether (1.2 liters) is added to the solution; the hydrobromide is filtered, washed with ether and dried in vacuo over sodium hydroxide for a short time. It is dissolved then in dimethylformamide (100 ml.), and is made alkaline with triethylamine (10.4 ml.). Benzyloxycarbonyl-L-glutamine p-nitrophenyl-ester (5.0 g.) is added to the mixture which is left to stand at room temperature for about three hours. The mixture is diluted with ethyl acetate (1 liter), the precipitate is filtered and washed with ethyl acetate (0.5 liter), ethanol (0.5 liter) and with ethyl acetate, hot ethyl acetate (0.25 liter) and hot chloroform (0.25 liter). The product is dried first in air and then at 50° in vacuo, weight 10.3 g. (93%), darkens from 250° dec. at 262–264°. A sample (1.0 g.) is dissolved in hot 80% ethanol (10 ml.), cooled, and diluted with 95% ethanol (30 ml.). Slow crystallization took place. After three days the crystals are filtered, washed with ethanol, chloroform and ethyl acetate. The dried material weighs 0.85 g., M.P. 250° dec., [α]₂₀ −32° (c. 2, dimethylsulfoxide).

*Analysis.*—Calc'd for $C_{49}H_{81}N_{15}O_{14}$ (percent): C, 53.3; H, 7.4; N, 19.0. Found (percent): C, 53.4; H, 7.5; N, 19.2.

EXAMPLE 13

Benzyloxycarbonyl - L - leucyl - L-glutaminyl-nitro-L-arginyl - L - leucyl - L - leucyl-L-glutaminylglycyl-L-leucyl-L-valinamide (IX)

The protected octapeptide (VIII) (11.1 g.) is powdered and added with stirring to acetic acid (50 ml.). Hydrobromic acid in acetic acid (ca. 4 N, 50 ml.) is added to the suspension, and stirring is continued until all the material dissolved and then for 30 minutes more. A total of three hours are required. The amine hydrobromide is precipitated with ether (1.3 liters), filtered, washed with ether and dried in vacuo over sodium hydroxide for a short time. The hydrobromide is dissolved in dimethylformamide (100 ml.), and triethylamine (10.4 ml.) is added to the cooled solution, followed by the benzyloxycarbonyl-L-leucine p-nitrophenylester (5.0 g.). After about three hours at room temperature the mixture is diluted with ethyl acetate (2 liters). The precipitate which formed is filtered and washed with 200 ml. portions of ethyl acetate, chloroform, hot chloroform and hot ethyl acetate. The product is dried in vacuo at 50°; weight 11.15 g. (91.5%), M.P. darkens from 255° dec. at about 265°. In a second similar preparation, a quantitative yield is obtained. Treatment of a sample (50 mg.) of (IX) with hydrobromic acid in acetic acid, precipitation of the free nonapeptide amide hydrobromide with ether, and paper chromatographic examination of the product in the system butanol-acetic acid-water, 4:1:5, reveals a single spot ($R_f$—0.77).

A sample of (IX) (0.50 g.) is dissolved in a hot mixture of ethanol (30 ml.) and water (15 ml.). The solution is filtered and allowed to stand at room temperature. After a few days, the crystals are collected, washed with liberal quantities of 95% ethanol, ethyl acetate and hot ethyl acetate. The air dry material (0.25 g.) darkens from 260°, melts with dec. at 267–269°. For analysis, it is dried at 110° in vacuo.

*Analysis.*—Calc'd for $C_{55}H_{92}N_{16}O_{15}$ (percent): C, 54.3; H, 7.6; N, 18.4. Found (percent): C, 54.2; H, 7.8; N, 18.2.

EXAMPLE 14

Benzyloxycarbonyl - nitro - L-arginyl-L-leucyl-L-glutaminyl - nitro - L - arginyl-L-leucyl-L-leucyl-L-glutaminyl-glycyl-L-leucyl-L-valinamide (X)

The protected nonapeptide amide (IX) (9.8 g.) is suspended in acetic acid (40 ml.) and hydrobromic acid in acetic acid (ca. 4 N, 40 ml.) is added to the suspension. A homogeneous solution is obtained in about one hour, and the solution is kept at room temperature for an additional hour. Ether (900 ml.) is added to the solution. The precipitated hydrobromide is filtered, washed with ether and dried in vacuo over sodium hydroxide for a short time. It is dissolved in dimethylformamide (80 ml.); the solution is cooled while being made alkaline with triethylamine (5.5 ml.). Benzyloxycarbonyl nitro-L-arginine 2,4-dinitrophenyl ester (10.3 g.) (prepared as described in the preparation of VII) is added followed by more triethylamine (2.2 ml.). After three hours at room temperature when the solution gives no reaction with ninhydrin, it is diluted with ethyl acetate (1 liter). Next day the precipitate is collected on a filter and is washed with ethyl acetate (200 ml.), chloroform (200 ml.), hot chloroform (750 ml.), abs. ethanol (200 ml.), and ethyl acetate (200 ml.). The product (8.2 g., 72%) darkens from 250° and melts with dec. at 255–264°. The benzyloxycarbonyl group is removed from a small sample with hydrobromic acid in acetic acid; the resulting free amine gives a single spot on paper chromatograms with $R_f$=0.80 in the system of butanol-acetic acid-water (4:1:5) or with $R_f$=0.60 in the system of butanol-pyridine-acetic acid-water (30:20:6:24).

*Analysis.*—Calc'd for $C_{61}H_{103}O_{18}N_{21}$ (M.W. 1418.8) (percent): C, 51.7; H, 7.3; N, 20.7. Found (percent): C, 51.9; H, 7.6; N, 20.1.

EXAMPLE 15

Benzyloxycarbonyl - L - alanyl - nitro-L-arginyl-L-leucyl-L - glutaminylnitro - L - arginyl - L - leucyl-L-leucyl-L-glutaminylglycyl-L-leucyl-L-valinamide (XI)

The protected decapeptide amide (X) (5.68 g.) is dissolved in acetic acid (30 ml.) and treated with a solution of hydrobromic acid in acetic acid (ca. 4 N, 30 ml.). After one and one-half hours at room temperature, the decapeptide hydrobromide is precipitated with ether (600 ml.), washed with ether and dried briefly in vacuo over sodium hydroxide pellets. The hydrobromide is dissolved in dimethylformamide (40 ml.); triethylamine (4.6 ml.) is added to the solution followed by benzyloxycarbonyl-L-alanine p-nitrophenylester (1.72 g.). Finally the mixture is made alkaline with more triethylamine (0.5 ml.). The reaction is allowed to proceed overnight, then the mixture is diluted with choroform. The addition of 250 ml. of this solvent results in a clear solution, with a second 250 ml. portion a crystalline precipitate forms. This is collected, washed with chloroform (200 ml.) and ethyl acetate (100 ml.). The dry product (4.85 g., 81.5%) melts at 258–264° dec.

*Analysis.*—Calc'd for $C_{64}H_{108}N_{22}O_{19}$ (percent): C, 51.6; H, 7.3; N, 20.7. Found (percent): C, 51.0; H, 7.5; N, 19.9.

EXAMPLE 16

L - aspartyl - L - seryl - L - alanyl - L - arginyl-L-leucyl-L-glutaminyl - L - arginyl-L-leucyl-L-leucyl-L-glutaminyl-glycyl-L-leucyl-L-valinamide (XIIIa)

(a)(1) L - alanyl - L - arginyl-L-leucyl-L-glutaminyl-L-arginyl - L - leucyl-L-leucyl-L-glutaminylglycyl-L-leucyl-L-valinamide (acetate) (XIa).—The protected hendecapeptide (XI) (3.0 g.) is dissolved in 86% acetic acid (100 ml.) and hydrogenated in the presence of a 10% palladium on charcoal catalyst (1.5 g.) for two days. The catalyst is removed by filtration and the solvents by evaporation in vacuo. A sample of this free hendecapeptide acetate (XIa) is examined on paper chromatograms in the system of n-butanol-acetic acid-water (4:1:5), where it gives a single spot ($R_f$=0.15) both with ninhydrin and the Sakaguchi reagent. Similarly, a single spot ($R_f$=0.6) is revealed in the system n-butanol-acetic acid-pyridine-water (30:6:20:24).

(2) Benzyloxycarbonyl - L - aeryl - L-alanyl-L-arginyl-L - leucyl - L - glutaminyl - L-arginyl-L-leucyl-L-leucyl-L-glutaminylglycyl-L-leucyl-L-valinamide (acetic) (XII).— To the free hendecapeptide (XIa) in dimethylformamide (40 ml.) benzyloxycarbonyl-L-serine 2,4-dinitrophenyl ester (1.0 g.) is added. The mixture, a gel, is filtered through a glass filter, and undissolved material on the filter is brought into solution with small portions of hot dimethylformamide. A total of 60 ml. of this solvent is used. After three hours, more of the active ester (0.6 g.) is added. After an additional hour, the mixture gives no reaction with ninhydrin. Next day, the mixture is diluted with ethyl acetate (900 ml.), the resulting oily precipitate is triturated with ethyl acetate (1 liter), the solidified protected dodecapeptide (XII) is filtered and washed with ethyl acetate. The product (2.1 g.) is impure as shown by its broad M.P.: sinter at 73°, melts with dec. at 163°. Evaporation of the mother liquor and trituration of the residue with ethyl acetate gives an additional quantity (0.97 g.) of material with a similar melting point.

(3) The crude protected dodecapeptide (XII) (0.65 g.) is dissolved in a mixture of water (40 ml.) and acetic acid (4 ml.) and the solution is extracted with ethyl acetate (three 20 ml. portions). The ethyl acetate extracts are washed with water (10 ml.). The aqueous wash is pooled with the main aqueous solution; a 10% palladium on charcoal catalyst (0.2 g.) is added and the mixture is hydrogenated for about four hours. After the removal of the catalyst by filtration, the solution is lyophylized. The crude free dodecapeptide weighs 0.46 g. A similar preparation (from 2 moles of protected dodecapeptide) is dissolved in dimethylformamide (10 ml.) and treated with benzyloxycarbonyl-L-aspartic acid β-benzyl, α-p-nitrophenylester (1.44 g.). Next day a second portion (0.48 g.) of the active ester is added to the mixture and after three more hours, a last portion (0.48 g.). After three more hours at room temperature, ethyl acetate (400 ml.) is added; the precipitate which formed is filtered and washed with ethyl acetate (200 ml.). The material, which turns into a crystalline mass on the filter, weighs 2.65 g., M.P. 200–220° dec. This crude preparation (1.3 g.) is dissolved in a mixture of acetic acid (40 ml.) and water (40 ml.), a 10% palladium on charcoal catalyst (0.65 g.) is added and the mixture is hydrogenated overnight. After removal of the solvent by filtration and the solvents by evaporation in vacuo, the residue is distributed in a system of n-butanol-0.2% dichloroacetic acid in water, through 60 transfers. Forty ml. lower and upper phases are used. The material in tubes No. 16–26 is practically pure as shown on paper chromatograms, which reveals the presence of a trace of aspartic acid in these fractions. Tubes No. 0–7 contain mostly aspartic acid. In tubes 8–15, the free tridecapeptide contaminated with more aspartic acid is present. A fast moving, ninhydrin-negative, Sakaguchi-positive impurity travels close to the front and is easily separated from the desired material. The contents of tubes No. 16–26 are pooled, the solvents evaporate to a small volume in vacuo, and the free tridecapeptide (XIIIa) is isolated by lyophylization (170 mg.). After hydrolysis with constant boiling hydrochloric acid at 110° for 16 hours in vacuo, a sample shows the following ratios of amino acids: Glu, 2.0; Asj, 1.4; Ser, 0.9; Gly, 1.1; Ala, 1.1; Val, 1.0; Leu, 3.8; $NH_3$, 2.9; Arg, 1.9. Examination of a sample by paper electrophoresis (collidine acetate, pH 6.3, and triethanolamine acetate, pH 4.0) reveals a small amount of aspartic acid as an impurity, but the peptide travels as a single component towards the cathode.

The fast moving, ninhydrin-negative, Sakaguchi-positive impurity, which is separated in the above mentioned countercurrent distribution, on amino acid analysis reveals that it contains only the amino acids present in the hendecapeptide derivative (XI). Calc'd for the acetyl derivative of the free hendecapeptide (di-dichloroacetate): N, 17.8; Cl, 9.1; $CH_2CO$, 8.2. Found: N, 17.1; Cl, 9.5; $CH_3CO$, 7.0.

(b)(1) Tert.-butoxylcarbonyl-L-aspartic acid α-p-nitrophenyl, β-benzyl ester.—To a cooled solution of tert. butoxycarbonyl-L-aspartic acid β-benzyl ester (16.2 g.) and of p-nitrophenol (8.5 g.) in ethyl acetate (150 ml.) dicyclohexylcarbodiimide (10.3 g.) is added. After two hours at room temperature, acetic acid (0.5 ml.) is added, the dicyclohexylurea is removed by filtration and washed with ester and the combined filtrates are evaporated in vacuo. The oily residue crystallizes on the addition of 95% ethanol. The crystals are collected, washed with ethanol and dried. Evaporation of the mother liquor gives more of the same active ester. A total of 15 g. is obtained, M.P. 80–81°, $[\alpha]_D^{25}$ —30° (c. 2, dimethylformamide containing 1% acetic acid).

Calc'd for $C_{22}H_{24}O_8N_2$: N, 6.30%. Found: N, 6.34%.

(2) N - tert.-butyloxycarbonyl-O-benzyl-L-seryl-L-alanyl-nitro-L-arginyl-L-leucyl-L-glutaminyl-nitro-L-arginyl-L-leucyl-L-leucyl-L-glutaminylglycyl-L-leucyl-L-valinamide (XIIb).—To a suspension of the protected hendecapeptide (XI) (6.4 g.) in acetic acid (45 ml.), a 4 N solution of hydrobromic acid in acetic acid (45 ml.) is added. After about 2 hours at room temperature, the solution is diluted with ether (650 ml.). The gummy recipitate is triturated with ether, filtered, washed with ether and dried in vacuo over sodium hydroxide. The hydrobromide is dissolved in methanol (40 ml.) and reprecipitated with ether (300 ml.). The semisolid mass is triturated with ether, filtered, washed with ether and dried as before. The solid material is suspended in methanol (200 ml.) and enough triethylamine (5 ml.) is added to render the mixture slightly alkaline. The solvent is removed in vacuo and the residue extracted with chloroform (50 ml.). The insoluble material is dried in vacuo; 6.1 g., M.P. 242–248° dec. In a system of n-butanol-acetic acid-water (4:1:5), a single spot ($R_f$-0.62) is revealed with ninhydrin and U.V. absorption. In the system butanol-pyridine-acetic acid-water (30:20:6:24) a single spot is also found ($R_f$=0.72). The hydrobromide is partially dissolved in dimethylformamide (20 ml.), triethylamine (0.6 ml.) and N-tert.-butyloxycarbonyl-O-benzyl-L-serine p-nitrophenylester in dimethylformamide (20 ml.) is added. The active ester is prepared from the corresponding acid (2.55 g.), p-nitrophenol (1.5 g.) and dicyclohexylcarbodiimide (1.7 g.) in ethyl acetate (21 ml.). The oil which is left after the removal of the dicyclohexylurea by filtration and of the solvent by evaporation is used without purification. The mixture is filtered and the yet undissolved material is dissolved with hot dimethylformamide (100 ml.). The mixture is allowed to stand overnight at room temperature. The protected dodecapeptide is isolated by the addition of ethyl acetate (1.5 liters); the precipitate is filtered and washed with ethyl acetate (0.5 liter). The crude product (5.14 g.) after darkening at 255° melts with dec. at 298°.

A sample (1.0 g.) of this material is suspended in 95% ethanol (25 ml.), heated to boiling for a few minutes, and allowed to cool. During this treatment the solid material changes into a crystalline mass. The purified material is washed with 95% ethanol and dried. The product (0.78 g.) darkens from 255° and melts with dec. at 298–304°.

(3) Tert.-butyloxycarbonyl - β-benzyl-L-aspartyl-O-benzyl-L-seryl-L-alanyl-nitro-L-arginyl-L-leucyl-L-glutaminyl-nitro - L - arginyl-L-leucyl-L-leucyl-L-glutaminylglycyl-L-leucyl-L-valinamide (VIII).—The protected dodecapeptide amide (XII) (3.3 g.) is dissolved in trifluoroacetic acid (32 ml.). After about fifteen minutes most of the trifluoroacetic acid is evaporated in vacuo and the syrupy residue diluted with ether (300 ml.). The precipitate is collected, washed with ether and dried in vacuo over sodium hydroxide. The free amine trifluoroacetate (3.2 g.), has no well defined melting point; it softens at about 135°, darkens from 240° and decomposes at 304°. On paper chromatograms in the system butanol-acetic acid-water (4:1:5), a single component ($R_f$=0.52) is revealed by U.V. absorption and by ninhydrin. This material is dissolved in dimethylformamide (250 ml.), triethylamine (0.28 ml.) and tert.-butyloxycarbonyl-β-benzyl-L-aspartic acid p-nitrophenylester (1.76 g.). The solution is concentrated in vacuo to about 100 ml. Next day more triethylamine (0.28 ml.) and tert.-butyloxycarbonyl-β-benzyl-L-aspartic acid p-nitrophenylester (0.88 g.) are added. One day later the mixture gave no more reaction with ninhydrin. It is diluted with ethyl acetate (500 ml.); the precipitate is filtered, washed with ethyl acetate and dried at room temperature. The protected tridecapeptide softens and darkens from about 250° and melts with dec. at 307–309°.

Analysis.—Calc'd for $C_{82}H_{132}N_{24}O_{24}$ (percent): C, 53.6; H, 7.6; N, 18.3. Found (percent): C, 54.3; H, 7.2; N, 18.5.

(4) A sample of the fully protected tridecapeptide amide (XIII) (40 mg.) is dissolved in acetic acid (4 ml.); a 10% palladium on charcoal catalyst (40 mg.) is added and the mixture hydrogenated for 2 days. The catalyst is filered off and the acetic acid removed by evaporation from the frozen state. The residue is dissolved in acetic acid (1 ml.) and a solution of hydrogen chloride in acetic acid (2.6 N, 0.5 ml.) is added. Soon an oily precipitate forms. After about one-half hour the mixture is diluted with ether and the precipitate, which solidifies, is washed with ether. The white solid material (hydrochloride) is shown to be homogeneous on paper chromatograms in the systems of butanol-acetic acid-water (4:1:5) and butanolacetic acid-pyridine-water (30:6:20:24). In this system the tridecapeptide travels as a single spot with $R_f$ values 0.32 and 0.28 respectively. The spots are revealed with ninhydrin and with the Sakaguchi reagent. On paper electrophoresis in collidine-acetate (pH 7) the material travels as a single band toward the cathode and is indistinguishable from the product obtained by procedure (a).

EXAMPLE 17

N-benzyloxycarbonyl-β-benzyl-L-aspartyl - O - benzyl-L-seryl-L-alanyl-nitro-L-arginyl - L - leucyl-L-glutaminyl-nitro-L-arginyl-L-leucyl-L-leucyl - L - glutaminylglycyl-L-leucyl-L-valinamide (XIIIb)

The protected dodecapeptide amide (XIIb) (0.82 g.) is suspended in acetic acid (24 ml.). A solution of hydrochloric acid in acetic acid (2.6 N, 15 ml.) is added. This causes the dodecapeptide to dissolve, but soon the corresponding amine hydrochloride deposits as an oil. After one-half hour at room temperature, ether (ca. 200 ml.) is added to the mixture; the residue, which solidifies is washed with ether and dried over sodium hydroxide in vacuo. This hydrochloride is suspended in dimethylformamide (ca. 10 ml.) and treated with triethylamine (0.2 ml.) and N-tert.-butoxycarbonyl-L-aspartic acid β-benzyl-, α-p-nitrophenylester (0.44 g.). The mixture is filtered from insoluble material, the filter being rinsed with dimethylformamide (5 ml.). After about 16 hours at room temperature, the mixture is diluted with ether (ca. 200 ml.). The protected tridecapeptide is washed with ether and dried; 0.66 g. of a product, M.P. 250–255° are obtained. Catalytic reduction of (XIIIb) followed by treatment with hydrochloric acid in acetic acid yields the free tridecapeptide (XIIIa).

EXAMPLE 18

$N^\alpha$-tert.-butyloxycarbonyl - nitro - L-arginyl-β-benzyl-L-aspartyl-O-benzyl-L-seryl - L - alanyl - nitro-L-arginyl-L-leucyl-L-glutaminyl-nitro-L - leucyl - L - leucyl - glutaminylglycyl-L-leucyl-L-valinamide (XVI)

The protected tridecapeptide (XIII) (0.92 g.) is dissolved in trifluoroacetic acid (18 ml.). After about 15 minutes at room temperature, most of the trifluoroacetic acid is removed in vacuo and the residue is triturated with ether (100 ml.). The free amine-trifluoroacetate is filtered, washed with ether and dried in vacuo over sodium hydroxide. Paper chromatographic examination of this material in the system of butanol-acetic acid-water (4:1:5) reveals a single (ninhydrin yellow) component at $R_f = 0.78$.

To a solution of the trifluoroacetate in dimethylformamide (15 ml.), tert.-butyloxycarbonyl-nitro-L-arginine 2,4-dinitrophenylester (0.43 g.) (prepared by the method of Example 11, substituting t-butyloxycarbonyl-nitro-L-arginine for the benzyloxycarbonyl-nitro-L-arginine) is added followed by triethylamine (0.07 ml.). The mixture is concentrated in vacuo to about 6-8 ml. and a second portion of triethylamine (0.07 ml.) is added. The next day the mixture is further concentrated in vacuo, and the residue is triturated with ethyl acetate. The protected tetradecapeptide is collected on a filter and is washed with ethyl acetate and with ether. The crude product (0.96 g.) sinters at about 145°, darkens from 220° and decomposes at 305°. An aliquot of this material (0.75 g.) is dissolved in the two layers (each 30 ml.) of the solvent system n-butanol-pyridine-acetic acid-water (4:2:1:7). The solution is placed in the first three tubes of a Craig apparatus and countercurrent distribution is carried out through one hundred transfers. Essentially all the material is found in a band corresponding to a distribution coefficient of 11.5, and the experimental curve is found to be practically identical with the curve calculated for this K value. The recovered material shows the same M.P. as the one before distribution.

*Analysis.*—Calc'd for $C_{88}H_{143}N_{29}O_{27}$ (percent): C, 51.8; H, 7.1; N, 19.9. Found (percent): C, 52.2; H, 6.7; N, 19.8.

The protected tetradecapeptide (XIV) (8.2 g.) is dissolved in trifluoroacetic acid (4 ml.). After 15 minutes at room temperature, the solution is concentrated in vacuo to syrup, ether (500 ml.) is added and the precipitate is washed on a filter with ether. The air dried trifluoroacetate (XIVa), (8.1 g.) softens at 140° and melts (dec.) at 250°. In butanol-acetic acid-water (4:1:5), a single spot, $R_f = 0.70$ is observed.

*Analysis.*—Calc'd (percent): N, 19.8; F, 2.8. Found (percent): N, 20.4; F, 3.3.

EXAMPLE 19

N-L-leucyl-N'-benzyloxycarbonyl hydrazine, trifluoroacetate (XV)

Tert.-butyloxycarbonyl-L-leucine monohydrate (10 g.—40 mmoles) and benzyloxycarbonyl hydrazine (6.64 g.—40 mmoles) are dissolved in dichloromethane (100 ml.). The solution is cooled in an ice-water bath and added with dicyclohexylcarbodiimide (8.25 g.—40 mmoles). After one hour stirring in the cold bath and five hours at room temperature, the precipitate of dicyclohexylurea is filtered off and washed with ethyl acetate. The filtrate is concentrated to dryness in vacuo, the residue is dissolved in ethyl acetate (150 ml.) and the solution is washed once with 20% aqueous citric acid, once with water, twice with saturated sodium bicarbonate and three times with water.. The organic phase is dried over magnesium sulfate and concentrated to dryness in vacuo. The solid residue is dissolved in cold trifluoroacetic acid (35 ml.) and the solution is kept at room temperature for 15 minutes. After removing most of the trifluoroacetic acid in vacuo at room temperature, the oily residue is dissolved in ether (ca. 40 ml.) and the crystalline trifluoroacetate is precipitated by addition of hexane (ca. 1 liter). Yield 13.2 g. (84%), M.P. (180) 182–183.

*Analysis.*—Calc'd for $C_{14}H_{21}N_3O_3 \cdot CF_3COOH$ (percent): C, 49.0; H, 5.65; N, 10.7; F, 14.5. Found (percent): C, 48.4; H, 5.52; N, 10.6; F, 14.3.

EXAMPLE 20

N-(tert.-butyloxycarbonylnitro-L-arginyl-L-leucyl)-N'-benzyloxycarbonyl hydrazine (XVI)

N-(L-leucyl-N'-benzyloxycarbonyl hydrazine trifluoroacetate (4.75 g.—12 mmoles) is suspended in tetrahydrofuran (24 ml.) and added ith triethylamine (1.68 ml.—12 mmoles) while cooling in an ice-water bath. Tert.-butyloxycarbonylnitro-L-arginine 2,4-dinitrophenyl ester (7.15 g.—14.4 mmoles) is added to the clear solution and the reaction mixture is kept at room temperature. At one hour intervals, two more portions of the above mentioned dinitrophenyl ester (0.7 g. each) are added. After overnight standing at room temperature, the reaction mixture is diluted with ethyl acetate (ca. 200 ml.) and washed once with 20% aqueous citric acid, once with water, ten times with 0.5 N ammonium hydroxide and four times with water. The organic phase is dried over magnesium sulfate and the solvent is removed in vacuo. The residue is disintegrated under ether, filtered, and dried. This crude product is boiled with ether (ca. 80 ml.) while adding small portions of ethyl acetate (up to a total of ca. 20 ml.). The amorphous solid slowly changes into a crystalline mass. After overnight standing at room temperature, the product is filtered and washed with ethyl acetate ether (1.9). Yield 6.5 g., M.P. (120) 124–128 $[\alpha]_D^{24}$ —40.2 (c. 1, MeOH).

*Analysis.*—Calc'd for $C_{25}H_{40}O_8N_8$ (percent): C, 51.7; H, 6.9; N, 19.3. Found (percent): C, 51.5; H, 7.2; N, 19.2.

EXAMPLE 21

N - (tert. - butyloxycarbonyl - O-benzyl-L-acryl-nitro-L-arginyl - L - leucyl)-N'-benzyloxycarbonyl hydrazine (XVII)

N - (tert. - butyloxycarbonylnitro-L-arginyl-L-leucyl)-N'-benzyloxycarbonyl hydrazine (7 g.–12 mmoles) is dissolved in cold trifluoroacetic acid (25 ml.) and the solution is kept at room temperature for 15 minutes. After removing most of the trifluoroacetic acid in vacuo at room temperature, the residue is disintegrated under ether, filtered, washed thoroughly with ether, and dried in vacuo over potassium hydroxide. This trifluoroacetate is dissolved in dimethylformamide (36 ml.) and added with triethylamine (1.68 ml.–12 mmoles) and tert.-butyloxycarbonyl-O-benzyl-L-serine p-nitrophenylester (prepared from 15 mmoles of tert.-butyloxycarbonyl-O-benzyl-L-serine). The reaction mixture is left at room temperature overnight, diluted with ethyl acetate and washed once with 20% aqueous citric acid and three times with water. The organic layer is dried over magnesium sulfate and the solvent is removed in vacuo. The residue is disintegrated under ether, filtered, washed with ether and dried. This crude product is crystallized from ethyl acetate. Yield 6.3 g. The sample for analysis is dried overnight at 60°, M.P. (110) 115–118 $[\alpha]_D^{24}$ −37.7 (c., 1, MeOH).

*Analysis.*—Calc'd for $C_{35}H_{51}N_9O_{10}$ (percent): C, 55.5; H, 6.8; N, 16.6. Found (percent): C, 55.3; H, 7.2; N, 16.5.

EXAMPLE 22

N - (tert. - butyloxycarbonyl - L - leucyl-O-benzyl-L-seryl - nitro - L-arginyl-L-leucyl)-N'-benzyloxycarbonyl hydrazine (XVIII)

N-(tert.-butyloxycarbonyl-O-benzyl - L - seryl-nitro-L-arginyl-L-leucyl-N'-benzyloxycarbonyl hydrazine (ca. 1 g.—8 mmoles) is dissolved in cold trifluoroacetic acid (23 ml.) and the solution is kept at room temperature for 15 minutes. The excess trifluoroacetic acid is removed in vacuo and the oily residue is disintegrated with ether, filtered, washed thoroughly with ether and dried in vacuo over KOH. This trifluoroacetate is dissolved in dimethylformamide (24 ml.) and to the resulting solution, triethylamine (1.12 ml.) and tert.-butyloxycarbonyl-L-leucine p-nitrophenylester (3.52 g.—10 mmoles) are added. The reaction mixture is left at room temperature overnight, diluted with ethyl acetate and washed once with 20% citric acid and twice with water. A precipitate appeared in the organic phase during the washings. The organic phase with the solid in suspension is concentrated to dryness in vacuo and the crystalline residue is recrystallized twice from absolute ethanol. Yield 5.8 g., M.P. 200–202 $[\alpha]_D^{24}$ −21° (c. 1.4 dimethylformamide).

*Analysis.*—Calc'd. for $C_{41}H_{62}N_{10}O_{11}$ (percent): C, 56.6; H, 7.2; N, 16.1. Found (percent): C, 55.9; H, 7.1; N, 16.1.

EXAMPLE 23

N - (tert. - butyloxycarbonyl - γ - benzyl - L - glutamyl-L-leucyl - O - benzyl - L - seryl - nitro - L - arginyl - L-leucyl) - N' - benzyloxycarbonyl hydrazine (XIX)

N - (tert. - butyloxycarbonyl - L - leucyl - O - benzyl-L-seryl - nitro - L - arginyl - L - leucyl) - N' - benzyloxycarbonyl hydrazine (3.5 g.—4 mmoles) is dissolved in cold trifluoroacetic acid (15 ml.) and the solution is kept at room temperature for 15 minutes. Most of the trifluoroacetic acid is removed in vacuo and the residue is triturated with ether, filtered, washed thoroughly with ether and dried in vacuo. This trifluoroacetate is dissolved in dimethylformamide (14 ml.) and to the resulting solution triethylamine (0.56 ml.) and tert.-butyloxycarbonyl-γ-benzyl-L-glutamic acid p-nitrophenylester (2.3 g.—5 mmoles) are added. After overnight standing at room temperature, a few drops of acetic acid are added and the solvent is removed in vacuo. The solid residue is disintegrated under ethyl acetate, filtered and dried. This material is recrystallized from methanol. Yield 3.65 g., M.P. 220–221.

*Analysis.*—Calc'd for $C_{53}H_{75}N_{11}O_{14}$ (percent): C, 58.4; H, 6.93; N, 14.14. Found (percent): C, 58.8; H, 7.13; N, 14.54.

EXAMPLE 24

(a) Benzyloxycarbonyl-nitro-L-arginyl-L-leucine methyl ester (1) To a solution of benzyloxycarbonyl - nitro - L-arginine (1.77 g.) and 2,4-dinitrophenol (0.92 g.) in tetrahydrofuran (30 ml.), dicyclohexylcarbodiimide (1.05 g.) is added and the mixture kept at room temperature (about 23° C.) for 45 minutes. Three drops of acetic acid are added, the N,N'-dicyclohexylurea is removed by filtration and is washed with tetrahydrofuran (20 ml.). The filtrate and washings are combined, the solvent removed in vacuo and the residue triturated with ether. The 2,4-dinitrophenyl benzyloxycarbonyl-nitro-L-arginate is filtered and washed with ether and weighs 2.5 g., M.P. ca. 60° dec. A sharp CO band is revealed in the IR spectrum at 5.62 mµ.

To a solution of methyl L-leucinate hydrochloride (1.0 g.) in chloroform (10 ml.), triethylamine (1.0 ml.) and the above crude active ester (2.0 g.) are added. Evolution of heat is observed. The solvent is concentrated in vacuo and the residue dissolved in absolute ethanol (50 ml.). Crystals separate from the solution. The product is washed with ethanol (25 ml.) and ethyl acetate (10 ml.) is dried at room temperature. A second crop is obtained by concentration of the mother liquor. Total yield is 1.0 g., M.P. 160–161°.

(2) The same protected dipeptide ester (VII) is also prepared by the mixed anhydride method using pivaloyl chloride as the activating reagent. The product is recrystallized from ethanol and is secured in 50–55% yield, M.P. 161–162°, $[\alpha]_D^{20}$ −22° (c. 1, MeOH). The melting point is unchanged even after several crystallizations from ethanol or acetone; prolonged drying in vacuo at 110°, however, raises the melting point to 162–163°.

*Analysis.*—Calc'd for VII, $C_{21}H_{32}N_6O_7$ (percent): C, 52.5; H, 6.7; N, 17.5. Found (percent): C, 52.6; H, 6.5; N, 17.3.

(b) N-benzyloxycarbonyl-O-acetyl-L-seryl-nitro-L-arginyl-L-leucine methyl ester

The protected dipeptide ester from (a) (9.6 g.) is suspended in acetic acid (40 ml.) and treated with a solution of hydrobromic acid in acetic acid (ca. 5 N, 30 ml.). Within a few minutes, a clear solution results. After about one hour at room temperature, ether (700 ml.) is added to the solution and the semi-solid deposit which forms is triturated with fresh ether. The hydrobromide is filtered, washed with ether (600 ml.) and dried in vacuo over sodium hydroxide for a short time. It is dissolved in dimethylformamide (50 ml.) and triethylamine (6 ml.) and N-benzyloxycarbonyl-O-acetyl-L-serine p-nitrophenylester (10 g.) are added to the mixture.

After two hours at room temperature, the precipitated triethylammonium bromide is filtered off and washed with dimethylformamide (25 ml.). Acetic acid (5 ml.) is added to the combined filtrates which are then diluted with ethyl acetate (500 ml.), refiltered, and washed three times with 500 ml. portions of water. The water washes are re-extracted with ethyl acetate (300 ml.). The ethyl acetate solutions are evaporated in vacuo and the oily residue triturated with ether. The product is washed with ether (a total of 600 ml.) and dried in air which weighs 12.2 g., M.P. 90–105°. The crude product is dissolved in chloroform (100 ml); the crystals which separate are washed with chloroform (50 ml.) and dried, weighing 8.6 g. (70%), M.P. 115–119° with sintering at 113°, $[\alpha]_D^{20}$ −27° (c. 2, 95% EtOH).

*Analysis.*—Calc'd for VIII, $C_{26}H_{39}N_7O_{10}$ (percent): C, 51.2; H, 6.5; N, 16.1. Found (percent): C, 51.3; H, 6.4; N, 16.0.

A second crop is obtained from the mother liquor, weighing 1.5 g. (12%), M.P. ca. 115°.

(c) Tert.-butyloxycarbonyl-L-leucyl-O-acetyl-L-seryl-nitro-L-arginyl-L-leucine methyl ester (XX)

N - benzyloxycarbonyl-O-acetyl-L-seryl-nitro-L-arginyl-L-leucine methyl ester (6.2 g.—10 mmoles) is dissolved in a mixture of glacial acetic acid (30 ml.) and hydrogen bromide in acetic acid (30 ml.—ca. 4N). After one hour standing at room temperature, ether is added (450 ml.) and the precipitate is filtered, washed thoroughly with ether and dried in vacuo. This hydrobromide is dissolved in dimethylformamide (35 ml.) and to the resulting solution triethylamine (3.0 ml.) and tert.-butyloxycarbonyl-L-leucine p-nitrophenylester (3.90—11 mmoles) are added. The reaction mixture is kept at room temperature overnight diluted with ethyl acetate (150 ml.) and washed with 20% aqueous citric acid and water. The organic layer is dried over magnesium sulfate and the solvent is removed in vacuo. The crystalline residue is taken-up with ethyl acetate, filtered, washed with ethyl acetate and dried. Yield 5.58 g., M.P. (170) 176–178, $[\alpha]_D^{24}$ —27.2 (c., 1.1, dimethylformamide).

*Analysis.*—Calc'd for $C_{29}H_{52}O_{11}N_8$ (percent): C, 50.6; H, 7.6; N, 16.3. Found (percent): C, 50.2; H, 7.9; N, 15.9.

EXAMPLE 25

Tert.-butyloxycarbonyl-L-benzyl-L-glutamyl-L-leucyl - O-acetyl-L-seryl-nitro-L-arginyl-L - leucine methyl ester (XXI)

Tert.-butyloxycarbonyl-L-leucyl-O-acetyl-L-seryl - nitro-L-arginyl-L-leucine methyl ester (4.1 g.—6 mmoles) is dissolved in cold trifluoroacetic acid (15 ml.) and the solution kept at room temperature for 15 minutes. Most of the trifluoroacetic acid is removed in vacuo and the residue is triturated with ether, filtered, washed thoroughly with ether and dried in vacuo. This trifluoroacetate is dissolved in dimethylformamide and the resulting solution is added with triethylamine (0.84 ml.) and tert.-butyloxycarbonyl-γ-benzyl-L-glutamic acid p-nitrophenyl-ester (3.4 g.—7.5 mmoles). The reaction mixture is kept at room temperature for 4 hours, diluted with ethyl acetate, washed with 20% aqueous citric acid, and water. The organic phase is dried over magnesium sulfate and the solvent is removed in vacuo. The crystalline residue is taken-up in ethyl acetate, filtered, washed with ethyl acetate and dried. M.P. (195) 197–198, $[\alpha]_D^{24}$ —23.9 (c. 1.1, dimethylformamide).

*Analysis.*—Calc'd for $C_{41}H_{65}O_{14}N_9$ (percent): C, 54.23; H, 7.21; N, 13.89. Found (percent): C, 54.62; H, 7.34; N, 13.89.

EXAMPLE 26

Tert.-butyloxycarbonyl-L-glutamyl-L-leucyl-L-seryl-L-arginyl-L-leucine hydrazide (XXII)

Tert.-butyloxycarbonyl-γ-benzyl-L-glutamyl-L - leucyl-O-acetyl-L-seryl-nitro-L-arginyl-L - leucine methyl ester (4.2 g.) is dissolved in 80% aqueous acetic acid and hydrogenated in the presence of 10% palladium on charcoal (500 mg.) for 48 hours. The catalyst is filtered off and the filtrate is freeze dried. This protected pentapeptide methyl ester (3.6 g.) is dissolved in 5% methanolic hydrazine (175 ml.) and the solution is kept at room temperature for 3 hours. After this period it is concentrated to half volume in vacuo and ethyl acetate added until complete precipitation. The precipitate is filtered, washed with ethyl acetate and dried. Yield 2.97 g.

*Analysis.*—Calc'd for $C_{31}H_{58}N_{10}O_{10}$ hydrazine: N, 3.83%. Found: N, 4.12%.

This compound is also obtained by hydrogenolysis of N-(tert.-butyloxycarbonyl-γ-benzyl-L-glutamyl-L-leucyl - O-benzyl - L - seryl-nitro-L-arginyl-L-leucyl)-N'-benzyloxycarbonyl hydrazine.

EXAMPLE 27

Benzyloxycarbonyl-L-threonyl-L-serine methyl ester (XXIII)

To a solution of 0.93 g. (6 mmoles) of serine methyl ester hydrochloride in 10 ml. of dimethylformamide, 0.84 ml. of triethylamine is added followed by 1.68 g. of benzyloxycarbonyl-L-threonine 2,4-dinitrophenyl ester. The mixture is stirred for an hour at room temperature. The solvent is removed in vacuo, and the residue is extracted with a mixture of 60 ml. of 0.1 N hydrochloric acid and 60 ml. of ethyl acetate. The ethyl acetate solution is washed successively with 3× 50 ml. of saturated sodium bicarbonate solution and 2× 50 ml. of water. Evaporation of the solvent and washing the residue with a little ether yields 0.65 g. of light yellowish white crystals, M.P. 134–136°. The mother liquors are combined and extracted with 2× 100 ml. of ethyl acetate. After washing the ethyl acetate solution with 2× 50 ml. of water, the solvent is removed in vacuo, and the residue washed with ether to give 0.49 g. of crystals, M.P. 134–136° (total yield 84%). Crystallization of a sample from a mixture of benzene and methanol did not raise the melting point; $[\alpha]_D^{25}$ —1.1 (c. 2.2, ethanol), $[\alpha]_D^{25}$ +63.0, (c. 0.46 dimethylformamide).

*Analysis.*—Calc'd for $C_{16}H_{22}O_7N_2$: $OCH_3$, 8.78%. Found: 8.79%.

EXAMPLE 28

Benzyloxycarbonyl-L-phenylalanyl-L-threonyl-L-aerine methyl ester (XXIV)

A solution of 10.5 g. (30 mmoles) of benzyloxycarbonyl-L-threonyl-L-serine ester in 100 ml. of ethyl alcohol and 30 ml. of 1 N HCl is hydrogenolyzed over 1.05 g. of 10% palladium on carbon for 7 hours. The catalyst is filtered and the solution is evaporated to a syrup. To a solution of the unprotected dipeptide in 150 ml. of dimethylformamide containing 4.2 ml. of triethylamine, 14.5 g. (36 mmoles) of benzyloxycarbonyl-L-phenylalanine p-nitrophenylester is added and the mixture stirred at room temperature for 6 hours. The solvent is removed in vacuo, and the residue digested with 150 ml. of ethyl acetate. The crystalline solid is collected and dried, 13.1 g. (88% yield), M.P. 168–172°. An analytical sample is obtained by two crystallization from dilute methanol, M.P. 179–181°, $[\alpha]_D^{25}$ —6.8 (c., 0.84, dimethylformamide).

*Analysis.*—Calc'd for $C_{25}H_{31}N_3O_8$ (percent): C, 59.87; H, 6.23; N, 8.38. Found (percent): C, 59.72; H, 6.14; N, 8.30.

EXAMPLE 29

Benzyloxycarbonyl-L-threonyl-L-phenylalanyl-L-threonyl-L-serine methyl ester (XXV)

(a) By the azide procedure.—To a solution of 3.32 g. (8 mmoles) of benzyloxycarbonyl-L-threonyl-L-phenylalanine hydrazide in a mixture of 10 ml. of dimethylformamide and 5 ml. of concentrated hydrochloric acid cooled to —15°, a solution of 0.56 g. of sodium nitrite in 2 ml. of water is added during the course of 3 minutes. The reaction mixture is stirred at —10° for 10 minutes, and the pH adjusted to 6.5 with ca. 6.9 ml. of triethylamine. To the above mixture, a solution of L-threonyl-L-serine methyl ester hydrochloride [obtained by the hydrogenolysis of 2.83 g. (8 mmoles) of benzyloxycarbonyl-L-threonyl-L-serine methyl ester in ethanol over Pd/C] in 10 ml. of dimethylformamide containing 1.1 ml. of triethylamine is added. The mixture is stirred at —10° for 15 minutes, and then left overnight at 4°. The solvent is removed in vacuo, and the solid that separated upon addition of 20 ml. of water is collected, washed with a mixture of ethyl acetate and ether, and dried to give 1.45 g. of a crude product, M.P. 142–152°. Crystallization from dilute methanol gives 0.71 g. (15% yield) of white crystals, M.P. 184–187°, [α]$_D^{25}$ —4.0 (c., 0.53, dimethylformamide).

*Analysis.*—Calc'd for $C_{29}H_{33}N_4O_{10}$ (percent): C, 57.79; H, 6.38; N, 9.30. Found (percent): C, 57.25; H, 6.67; N, 9.38.

(b) By the active ester method.—A solution of 5.01 g. (10 mmoles) of benzyloxycarbonyl-L-phenylalanyl-L-threonyl-L-serine methyl ester in 500 ml. of ethyl alcohol and 10 ml. of 1 N HCl is hydrogenolyzed over 0.5 g. of 10% palladium on carbon for 8 hours. After filtering off the catalyst, the solvent is removed in vacuo to give a pale yellow solid. To a solution of the solid in 100 ml. of dimethylformamide containing 1.4 ml. of triethylamine, 4.98 g. (12 mmoles) of benzyloxycarbonyl-L-threonine dinitrophenyl ester is added, and the solution stirred overnight at room temperature. After removing the solvent in vacuo, 300 ml. of ethyl acetate is added and the solid that separated is collected and crystallized from dilute methanol to give 5.8 g. (96% yield) of white crystals, M.P. 190–192°. An analytical sample is obtained by two crystallizations from dilute methanol, M.P. 194–196°, [α]$_D^{25}$ —9.2 (c., 0.6, dimethylformamide).

*Analysis.*—Calc'd for $C_{29}H_{38}N_4O_{11}$ (percent): C, 57.79; H, 6.38; N, 9.30. Found (percent): C, 57.58; H, 6.58; N, 9.24.

EXAMPLE 30

Benzyloxycarbonyl-L-threonyl-L-phenylalanyl-L-threonyl-L-serine hydrazide (XXVI)

To a solution of 4.2 g. (7 mmoles) of benzyloxycarbonyl - L - threonyl-L-phenylalanyl-L-threonyl-L-serine methyl ester in 120 ml. of methyl alcohol, 3 ml. of hydrazine hydrate is added and the mixture stirred at room temperature overnight. The solid that separated is filtered and crystallized from 700 ml. of methyl alcohol to give 4.05 g. of white crystals (96% yield), M.P. 228–230° (d).

*Analysis.*—Calc'd for $C_{28}H_{38}N_6O_9$ (percent): C, 55.80; H, 6.36; N, 13.95. Found (percent): C, 56.03; H, 6.35; N, 13.80.

EXAMPLE 31

β-Benzyl-L-aspartylglycine trifluoroacetate (XXIX)

A solution of glycine (2.85 g., 35.3 mmoles) in a mixture of water (45 ml.) and pyridine (45 ml.) is adjusted to pH 8.5 with 4 N NaOH. The p-nitrophenyl ester of t-butyloxycarbonyl-β-benzyl-L-aspartic acid (14.70 g., 33.1 mmoles) is gradually added as the powdered solid over a 2½ hour period while the pH is kept in the range of 8.3 to 8.5 by addition of 4 N sodium hydroxide (in total 14.7 ml., 58.8 milliequivalents). After stirring for an additional hour, the clear solution is diluted with 100 ml. of water, adjusted to pH 6.1 and extracted 3 times with equal volumes of ether-hexane (60:40). The aqueous layer is then cooled, adjusted to pH 3 and extracted four times with ethyl acetate. The organic phase is washed once with water, dried over sodium sulfate and concentrated to dryness. The amorphous residue (10 g., 80% yield) does not crystallize, but can be converted to a crystalline dicyclohexylamine salt which is recrystallized from acetone (starts to melt at 126°, then resolidifies and finally melts at 190–200°). Reconversion to the free acid by extraction with ethyl acetate from 20% aqueous citric acid still does not yield a crystalline material. The amorphous t-butyloxycarbonyl-β-benzyl-L-aspartylglycine (9.7 g., 24.6 mmoles) is dissolved in trifluoroacetic acid (72 ml.) and allowed to stand at room temperature for 15 minutes. The major part of the trifluoroacetic acid is then removed by evaporation in vacuo, and dry ether (200 ml.) is added to the residue. After cooling and triturating the mixture, the solid which formed is collected by filtration, washed three times with cold ether and dried to yield 8.4 g. of product (M.P. 127–132°). Paper chromatography (solvent system I, butanol-acetic acid-pyridine-water, 30:6:20:24) reveals two ninhydrin positive spots ($R_f$ 0.26, 0.63). The brownish spot ($R_f$ 0.63) is the major one. The material is recrystallized by dissolving in water (260 ml.) at 40° and cooling. The solid is filtered, washed and dried to yield 4.4 g. of crystals (M.P. 138–143°). This material produces only one ninhydrin positive spot ($R_f$ 0.63, solvent system I), on paper chromatograms. The NMR spectra (deuterated dimethylsulfoxide), 2.62τ (5H, aromatic), 4.79τ (2H, benzyl methylene), 5.75τ (triplet, 1H, α proton in aspartic,), 6.13τ (d, 2H, J=6 c.p.s.), 7.06τ (d, 2H, J=6 c.p.s., aspartyl methylene), agreed with the desired structure, β-benzyl aspartylglycine. The fluorine analysis (13.33% F found) indicated the product is the trifluoroacetate salt.

EXAMPLE 32

Benzyloxycarbonyl-L-histidyl-L-seryl-β-benzyl-L-aspartylglycine (XXX)

Benzyloxycarbonyl-L-histidyl-L-serine hydrazide (5.08 g., 13.0 mmoles) in dimethylformamide (52 ml.) is cooled to 0° and brought into solution by the addition of concentrated hydrochloric acid (7.0 ml., 84.0 mmoles). While stirring and cooling this solution to —10°, a cold aqueous solution (1.66 ml.) containing 0.906 g. (13.13 mmoles) of sodium nitrite is gradually added during a 3 minute period. The mixture is stirred for an additional 6 minutes at —10°. To this solution of the azide is added a cold solution of the trifluoroacetate salt of β-benzyl-L-aspartylglycine (5.25 g., 13.3 mmoles) in dimethylformamide (23 ml.). Additional dimethylformamide (2 ml.) is used to wash in any of the amino component left behind. After cooling the reaction mixture to —20°, cold triethylamine (10.83 g., 107 mmoles) is added to bring the pH to 7. This neutralization causes a gelatinous precipitate to appear and the heterogeneous mixture is stirred at —10° for 20 minutes and then at 5° for 96 hours. The precipitate is filtered off and washed with cold dimethylformamide (25 ml.). The filtrate and washes are concentrated in vacuo with a bath temperature not higher than 35°. Chloroform is added to give a final volume of 250 ml. After cooling the mixture, the white precipitate which had formed is filtered off and washed with cold chloroform. This solid is then triturated with cold ether, filtered and washed three times with more cold ether. When dried, the solid weighs 8.80 g. On paper chromatograms (butanol-acetic acid-pyridine-water, 30:6:20:24, solvent system I) four spots ($R_f$ 0.81, 0.69, 0.64 and 0.54) are produced by Pauly reagent. There are no ninhydrin positive spots. In preparation for a countercurrent separation (using butanol-pyridine-acetic acid-water, 4:2:1:7), the product is dissolved in lower phase (180 ml.). However, addition of an equal volume of upper phase caused a crystalline material to appear. After the mixture is cooled, the product is filtered, washed and dried (4.15 g., 50%, M.P. 125–130°, dried in vacuo at 30° over potassium hydroxide) and found to be homogeneous ($R_f$ 0.81) in the paper chromatograms (solvent system I, Pauly reagent spray) and on silica gel plates ($R_f$ 0.75; butanol-acetic acid-water). The material in the mother liquor is then separated by countercurrent distribution (475 transfers) to give four peaks (K values 2.47, 1.0, 0.74, 0.51). Each peak tube is chromatographically homogeneous (paper chromatographic system described and Pauly reagent spray) and the $R_f$ values are respectively 0.82, 0.70, 0.63 and 0.54. From one peak (K 2.47), crystalline material (830 mg., 10%, M.P. 120–125°) is recovered. An NMR spectrum (in $CD_3COOD$) showed 12 protons in the region 1.95–2.62τ. A quantitative amino acid analysis give the following ratio of amino acids: aspartic:serine:glycine:histidine, 1.0:0.82:0.93:1.14.

A small portion of the crystalline product (32 mg.) dissolved in methanol-acetic acid-water (10:1:4) (15 ml.) is hydrogenolyzed in the presence of 10% palladium on charcoal (7 mg.) for 3 hours at atmospheric pressure. The product when recrystallized from ethanol-water yields 16 mg. of the free tetrapeptide (M.P. 283; dec.).

This material produced only one ninhydrin positive spot (R_f 0.10) on paper chromatograms (solvent system I). The protected tetrapeptide is soluble in dimethylformamide, pyridine and methanol and is recrystallized by dissolving in a minimum amount of pyridine without heating, adding a small amount of water and cooling. The white crystals melt at 128–131°.

EXAMPLE 33

L-glutamyl-L-leucyl-L-seryl - L - arginyl - L - leucyl - L-arginyl-L-aspartyl-L-seryl - L - alanyl - L - arginyl - L-leucyl-L-glutaminyl-L-arginyl-L-leucyl - L - leucyl - L-glutaminylglycyl-L-leucyl-L-valinamide (XXXI)

(a) Tert. - butyloxycarbonyl - L - glutamyl - L - leucyl-L - seryl - L - arginyl - L - leucyl - nitro - L - arginyl - β-benzyl - L - aspartyl - O - benzyl - L - seryl - L - alanyl-nitro - L - arginyl - L - leucyl - L - glutaminyl - nitro - L-arginyl - L - leucyl - L - glutaminylglycyl - L - leucyl - L-valinamide (XXXIa).—Tert.-butyloxycarbonyl - L - glutamyl-L-leucyl-L-seryl-L-arginyl-L-leucine hydrazide (450 mg.—0.6 mmole) is dissolved in dimethylformamide (4.5 ml.) and the solution is cooled in a Dry Ice-acetone bath at −20°. Concentrated hydrochloric acid (0.3 ml.) and 14% aqueous sodium nitrite are added (0.45 ml.), and the resulting solution is stirred in the cooling bath at −15° for 5 minutes. After this period the temperature of the cooling bath is lowered to −25° and the reaction mixture is added with N-ethyl piperidine (0.42 ml.) followed by a solution of nitro-L-arginyl-β-benzyl-L-aspartyl-O-benzyl-L-seryl-L-alanyl-nitro-L-arginyl - L - leucyl - L-glutaminyl-nitro-L-arginyl-L - leucyl - L - leucyl - L - glutaminylglycol - L - leucyl - L - valinamide trifluoroacetate (XIVa) (873 mg.) in dimethylformamide (4.5 ml.). The mixture is kept in the cooling bath for 10 minutes and then stored at 0–5° for three days. The solvents are removed in vacuo and the residue is disintegrated under ethyl acetate, filtered and dried.

(b) L - glutamyl - L - leucyl - L - seryl - L - arginyl-L - leucyl - nitro - L - arginyl - β - benzyl - L - aspartyl-O - benzyl - L - seryl - L - alanyl - nitro - L - arginyl - L-leucyl - L - glutaminyl - nitro - L - arginyl - L - leucyl-L - leucyl - L - glutaminylglycyl - L - leucyl - L - valinamide (XXXIb).—This product is dissolved in cold trifluoroacetic acid (20 ml.) and the solution is kept at room temperature for 15 minutes. Ether is added until complete precipitation and the precipitate is filtered, washed with ether and dried. This material is suspended in water (10 ml.), thoroughly disintegrated, centrifuged down, resuspended in water (10 ml.), centrifuged down and dried in vacuo. Yield 800 mg. This material shows on paper chromatography only one spot which is UV absorbing and Sakaguchi positive.

(a) L - glutamyl - L -leucyl - L - seryl - L - arginyl - L-leucyl - L - arginyl - L - aspartyl - L - seryl - L - alanyl - L-arginyl - L - leucyl - L - glutaminyl- L - arginyl - L - leucyl-L - leucyl - L - glutaminylglycyl - L - leucyl - L - valinamide.—A small sample of the product from (b) is hydrogenated for 48 hours in the presence of 10% palladium on charcoal. The product thus obtained (XXXI) is shown to be identical to the nonadecapeptide prepared by the stepwise procedure.

EXAMPLE 34

L - threonyl - L - phenylalanyl - L - threonyl - L - seryl-L - glutamyl - L - leucyl - L - seryl - L - arginyl - L-leucyl L - arginyl - L - aspartyl - L - seryl - L - alanyl-L - arginyl - L - leucyl - L - glutaminyl - L - arginyl-L - leucyl - L - leucyl - L - glutaminylglycyl - L - luecyl-L-valinamide acetate (XXXII)

Benzyloxycarbonyl - L - threonyl - L - phenylalanyl - L-threonyl - L - serine hydrazide (12.0 mg.—0.2 mmole) is dissolved in dimethylformamide (1.5 ml.) and the solution cooled in a Dry Ice-acetone bath at −20° and added with concentrated hydrochloric acid (0.1 ml.) and 14% aqueous sodium nitrite (0.11 ml.). After 5 minutes at −15° C. the temperature of the bath is brought down to −25° and N-ethyl piperidine (0.14 ml.) is added followed by a solution of the partially protected nonadecapeptide amide trifluoroacetate. The reaction mixture is stored for two days at 0–3°, added with another portion of tetrapeptide azide (prepared from 60 mg. of the tetrapeptide hydrazide) and kept for another two days at 0–3°. The reaction mixture is concentrated to dryness in vacuo, the residue, benzyloxycarbonyl-L-threonyl-L-phenyl - alanyl - L - threonyl - L - seryl - L - glutamyl-L - leucyl - L - seryl - L - arginyl - L- leucyl - nitro - L-arginyl - β - benzyl - L - aspartyl - O - benzyl - L - seryl-L - alanyl - nitro - L - arginyl - L - leucyl - L - glutaminyl-nitro - L - arginyl - L - leucyl - L - leucyl - L - glutaminylglycyl - L - luecyl - L - valinamide (XXXIIa), is triturated with ethyl acetate, filtered and dried. This product is hydrogenated for 48 hours over 10% palladium on charcoal to yield the tricosapeptide amide acetate (XXXII).

EXAMPLE 35

Benzyloxycarbonyl - L - histidyl - L - seryl - β - benzyl-L - aspartyl - glycyl - L - threonyl - L - phenylalanyl-L - threonyl - L - seryl - L - glutamyl - L - leucyl - L-seryl - L - arginyl - L - leucyl - L - arginyl - L - aspartyl-L - seryl - L - alanyl - L - arginyl - L - leucyl - L-glutaminyl - L - arginyl - L - leucyl - L - leucyl - L-glutaminylglycyl - L - leucyl - L - valinamide (XXXIII)

Benzyloxycarbonyl - L - histidyl - L - seryl - β - benzyl-L-aspartyl-glycine (130 mg.—0.2 mmole) is dissolved in acetonitrile (1.5 ml.) and added with triethylamine (0.03 ml.) and N-ethyl-5-phenylisoxazolium-3′-sulfonate (55 mg.—0.2 mmole). After 30 minutes a solution of 400 mg. of the tricosapeptide amide acetate (XXXII) in dimethylformamide (1.5 ml.) and water (0.5 ml.) are added. The reaction mixture is kept overnight at room temperature, the solvents are removed in vacuo and the residue triturated with absolute ethanol, filtered and dried. This material (XXXIII), after 16 hours hydrogenation over 10% palladium on charcoal, yields secretin.

EXAMPLE 36

N$^\alpha$ - benzyloxycarbonyl - L - hintidyl-L-seryl-β-benzyl-L-aspartylglycyl - L - threonyl-L-phenylalanyl-L-threonyl-O - benzyl - L - seryl-β-benzyl-L-glutamyl-L-leucyl-O-benzyl - L - seryl-nitro-L-arginyl-L-leucyl-nitro-L-arginyl - β - benzyl - L-aspartyl-O-benzyl-L-seryl-L-alanyl-nitro - L-arginyl-L-leucyl-L-glutaminyl-nitro-L-arginyl-L - leucyl - L - leucyl-L-glutaminylglycyl-L-leucyl-L-valinamide (XXXIV)

A sample (163 mg.) of the partially protected tricosapeptide trifluoroacetate (as prepared in Examples 1 to 28 of copending U.S. application of Miklos Bodanszky, Ser. No. 550,956, filed May 18, 1966 now U.S. Pat. 3,417,072) is dissolved in methanol (50 ml.) and treated with an ion exchange resin (Amberlite XN–1003, 3 g., in OH cycle) for one hour. After removal of the resin by filtration and of the solvent by evaporation, the residue is dissolved in dimethylformamide (2 ml.). The protected tetrapeptide benzyloxycarbonyl-L-histidyl-L-seryl-β-benzyl-L-aspartylglycine (64 mg.) is added to the solution followed by dicyclohexylcarbodiimide (12 mg.). After one hour at room temperature the solvent is removed in vacuo and the residue triturated with ethyl acetate to give a solid material (XXXIV), which in turn, is dissolved in acetic acid (10 ml.) and is hydrogenated in the presence of a 10% palladium on charcoal catalyst for 2½ days. After removal of the catalyst by filtration, the acetic acid is evaporated from the frozen state. The residue is dissolved in water. This solution shows the characteristic hormonal properties of secretin.

EXAMPLE 37

Benzyloxycarbonyl - L - threonyl - L - phenylalanyl-L-threonyl - L - seryl - L - glutamyl-L-leucyl-L-seryl-L-arginyl-L-leucine hydrazide (XXXV)

(a) L - glutamyl-L-leucyl-O-acetyl-L-seryl-L-arginyl-L-leucine methyl ester trifluoroacetate (XXI*a*).—Tert.-butyloxycarbonyl - γ - benzyl-L-glutamyl-L-leucyl-O-acetyl-L-seryl-nitro-L-arginyl-L-leucine methyl ester (XXI) (4.2 g.) is dissolved in 80% aqueous acetic acid and hydrogenated in the presence of 10% palladium on charcoal (500 mg.) for 48 hours. The catalyst is filtered off and the filtrate is freeze dried. The residue is dissolved in cold trifluoroacetic acid (15 ml.). The solution is kept at room temperature for 15 minutes, the excess trifluoroacetic acid is removed in vacuo and the residue triturated with ether, filtered and dried.

(b) Benzyloxycarbonyl - L-threonyl-L-phenylalanyl-L-threonyl - L - seryl-L-glutamyl-L-leucyl-L-seryl-L-arginyl-L - leucine hydrazide (XXXV).—Benzyloxycarbonyl-L-threonyl - L - phenylalanyl-L-threonyl-L-serine hydrazide (XXXVI), (120 mg., 0.2 mmole) is dissolved in dimethylformamide (1.5 ml.) and the solution cooled in a Dry Ice-acetone bath at —20° C. To the cooled solution concentrated hydrochloric acid (0.1 ml.) and 14% aqueous sodium nitrite (0.11 ml.) are added. After 5 minutes at —15° C., the temperature of the bath is lowered to —25° C. and N-ethyl piperidine (0.14 ml.) is added, followed by a solution of L-glutamyl-L-leucyl-O-acetyl-L-seryl-L-arginyl-L-leucine methyl ester trifluoroacetate (140 mg.) in dimethylformamide (1 ml.) and N-ethyl piperidine (0.03 ml.). The reaction mixture is kept at 0–3° C. for 3 days and diluted with ethyl acetate (50 ml.). The precipitated protected nonapeptide methyl ester is filtered and dried. This product is dissolved in 5% methanolic hydrazine and the solution kept at room temperature for 3 hours. The solvent is concentrated to half in vacuo and ethyl acetate is added until complete precipitation. The protected nonapeptide hydrazine is filtered and dried in vacuo over phosphorous pentoxide.

What is claimed is:

1. A method for synthesizing a protected form of the gastrointestinal hormone secretin which comprises condensing by peptide coupling methods the C-terminal carboxyl group of an N-protected tetrapeptide azide of the formula L-Thr-L-Phe-L-Thr-L-Ser with the unprotected N-terminal amino group of the partially protected nonadecapeptide of the formula L-Glu-L-Leu-L-Ser-L-Arg-L-Leu - ω - protected-L-Arg-β-protected-L-Asp-O-protected-L - Ser-L-Ala-ω-protected-L-Arg-L-Leu-Gln-ω-protected-L - Arg - L-Leu-L-Leu-L-Gln-Gly-L-Leu-L-Val-NH$_2$, removing the N-terminal protecting group of the resulting tricosapeptide, and condensing the activated C-terminal carboxyl group of an N-protected tetrapeptide of the formula L-His-L-Ser-β-protected-L-Asp-Gly to the unprotected N-terminal amino group of the tricosapeptide, wherein the N-protecting groups are benzyloxycarbonyl, tert.-butyloxycarbonyl, phthalyl, o - nitrophenylsulfenyl, or tosyl, the hydroxyl protecting groups are benzyl, tert.-butyl, or tetrahydropyranyl, the carboxyl protecting groups are benzyl, or lower alkyl, and the guanidine protecting groups are nitro, tosyl, p-nitrobenzyloxycarbonyl, or protonation.

2. A process according to claim 1 wherein the N-terminal amino group of the tetrapeptide L-Thr-L-Phe-L-Thr-L-Ser is protected by the benzyloxycarbonyl group.

3. A process according to claim 1 wherein the N-terminal amino group of the tetrapeptide L-His-L-Ser-β-protected-L-Asp-Gly is protected by the benzyloxycarbonyl group.

4. A process according to claim 2 wherein the N-terminal amino group of the tetrapeptide L-His-L-Ser-β-protected-L-Asp-Gly is protected by the benzyloxycarbonyl group and wherein the β-protecting group is benzyl.

5. A method for synthesizing the gastrointestinal hormone secretin which comprises removing the protecting groups from the protected secretin of claim 1.

References Cited
UNITED STATES PATENTS

| | | | |
|---|---|---|---|
| 3,228,926 | 1/1966 | Kappeler et al. | 260—112.5 |
| 3,287,346 | 11/1966 | Schwyzer et al. | 260—112.5 |
| 3,300,468 | 1/1967 | Schwyzer et al. | 260—112.5 |
| 3,309,353 | 3/1967 | Boissonnas et al. | 260—112.5 |
| 3,400,118 | 9/1968 | Bodanszky et al. | 260—112.5 |
| 3,417,072 | 12/1968 | Bodanszky | 260—112.5 |

OTHER REFERENCES

Ondetti et al., J. Amer. Chem. Soc. 90, 4711–4716 (1968).

Beyerman et al., Cited in Chem. Abst. 61, 1936–1937 (1964).

ELBERT L. ROBERTS, Primary Examiner